US008749162B2

(12) United States Patent
Kumar et al.

(10) Patent No.: US 8,749,162 B2
(45) Date of Patent: Jun. 10, 2014

(54) TWO LEVEL LIGHTING BALLAST

(75) Inventors: Nitin Kumar, Burlington, MA (US);
Shashank Bakre, Woburn, MA (US);
Thomas J. Schalton, Beverly, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 621 days.

(21) Appl. No.: 13/024,443

(22) Filed: Feb. 10, 2011

(65) Prior Publication Data

US 2012/0206059 A1   Aug. 16, 2012

(51) Int. Cl.
*H05B 37/02* (2006.01)
*H05B 41/24* (2006.01)

(52) U.S. Cl.
USPC ........... 315/291; 315/224; 315/250; 315/274; 315/307

(58) Field of Classification Search
USPC ............. 315/200 R, 205, 210, 224, 247, 250, 315/274, 291, 294, 307, 312
See application file for complete search history.

(56) References Cited

U.S. PATENT DOCUMENTS

| 4,383,204 A | 5/1983 | Roberts |
| 4,963,795 A | 10/1990 | Nilssn |
| 5,309,062 A | 5/1994 | Perkins et al. |
| 5,831,395 A | 11/1998 | Mortimer et al. |
| 6,177,769 B1 | 1/2001 | Bezdon |
| 6,262,542 B1 * | 7/2001 | Kim et al. ..................... 315/224 |
| 6,522,089 B1 * | 2/2003 | Duong et al. ................. 315/308 |
| 6,809,483 B2 * | 10/2004 | Alexandrov .................. 315/224 |
| 6,819,057 B2 * | 11/2004 | Alexandrov ............. 315/209 R |
| 6,906,473 B2 * | 6/2005 | Alexandrov .................. 315/224 |
| 7,084,579 B2 | 8/2006 | Konopka et al. |
| 7,218,063 B2 | 5/2007 | Konopka et al. |

FOREIGN PATENT DOCUMENTS

WO   02/39788 A1   5/2002

* cited by examiner

*Primary Examiner* — Douglas W Owens
*Assistant Examiner* — Thai Pham
(74) *Attorney, Agent, or Firm* — Shaun P. Montana

(57) ABSTRACT

A two level lighting ballast is provided, which includes a self-oscillating inverter circuit and a control circuit. The inverter includes an input; an output to selectively provide current to energize a lamp; a switching circuit operating at a switching frequency; a feedback transformer; and an impedance component. The feedback transformer is connected to the output, and drives the switching circuit based on the lamp current. The impedance component is connected in parallel with the feedback transformer, and is operated by the control circuit. When the control circuit enables the impedance component, the switching circuit operates in a first frequency range, and a first lamp current is provided. When the control circuit disables the impedance component, the switching circuit operates in a second frequency range, and a second lamp current is provided. The first frequency range is lower than the second, and the first lamp current is greater than the second.

15 Claims, 3 Drawing Sheets

FIG. 3

202 — providing lamp current to the lamp via a self-oscillating inverter circuit, wherein the lamp current provided to the lamp is a function of the switching frequency of the inverter circuit 204 — controlling the switching frequency of the inverter circuit via a feedback transformer, wherein the lamp current provided to the lamp is a function of the switching frequency of the inverter circuit 206 — enabling an impedance component connected in parallel with the feedback transformer so that the inverter is operated at a switching frequency in a first frequency range 208 — disabling the impedance component connected in parallel with the feedback transformer so that the inverter is operated at a switching frequency in a second frequency range, wherein the first frequency range is lower than the second frequency range

TWO LEVEL LIGHTING BALLAST

TECHNICAL FIELD

The present invention relates to lighting, and more specifically, to electronic ballasts for powering lamps.

BACKGROUND

Multiple level lighting systems allow a user to set the level of light the user desires to receive from the lamp or lamps within the lighting system. For example, a two level lighting systems allows the user to select between two different levels of light: full on, such that the lamp or lamps in the lighting system is/are at their maximum output setting, and half on, such that the lamp or lamps in the lighting system is/are at half of their maximum output setting. As a result, multiple level lighting systems are typically used in overhead lighting applications, to give the user a choice between levels of light.

A typical implementation of a two level lighting system includes two power switches and two ballasts. Each power switch in the lighting system controls only one of the ballasts in the lighting system. Turning on both of the switches at the same time powers both ballasts, thus producing full light output from the lighting system. Turning on only one of the switches applies power to only one of the ballasts in the lighting system and thus results in a reduced light level and a corresponding reduction in power consumed.

SUMMARY

The conventional two level lighting system described above suffers from a variety of deficiencies, most notably in economy. It is more economical to use only a single ballast instead of the two ballasts typically found in the conventional two level lighting system. One implementation of a two level lighting system using only a single ballast requires two switches and two lamp sets. Alternatively, a two level lighting system using only a single ballast may include two lamp sets and two controllers within the ballast, where each controller controls a lamp set. In order to shut off one lamp set, the supply voltage to the controller corresponding to that lamp set is pulled down (e.g., grounded) so that the controller is disabled. However, this implementation is not energy efficient. In addition to continuing to require two lamp sets, even though one of the two controllers is disabled, the supply voltage for that controller is still being pulled into the ballast from the power supply.

Embodiments of the present invention provide a multiple level lighting system using a single ballast that overcomes the deficiencies of the conventional two level lighting systems. In particular, embodiments are directed to a ballast having a self-oscillating inverter circuit and a control circuit. The control circuit operates a single lamp set between a first lighting level and a second lighting level. The first lighting level provides a greater amount of lumens than the second lighting level. In some embodiments, the self-oscillating inverter circuit has an inverter input to receive direct current (DC) voltage and an inverter output to selectively provide an alternating current (AC) lamp current to energize the lamp set. The control circuit adjusts an amount of impedance provided at the input of the inverter circuit. The control circuit makes this adjustment such that, when a first level (e.g., high level) of impedance is provided at the input of the inverter circuit, the lamp set operates at the first lighting level, and when a second level (e.g., low level of impedance is provided at the input of the inverter circuit, the lamp set operates at the second lighting level.

In some embodiments, the inverter circuit may include a switching circuit to operate at a switching frequency and a feedback transformer connected to the inverter output to drive the switching circuit as a function of the lamp current at the inverter output. An impedance component, such as a capacitor, is connected in parallel with the feedback transformer between the inverter input and the feedback transformer. The control circuit is connected to the impedance component to selectively operate the impedance component between a first state and a second state. In the first state, the impedance component is enabled. In the second state, the impedance component is disabled. When the impedance component is enabled, the switching circuit operates at a switching frequency in a first frequency range, and a first lamp current is provided to the lamp set. When the impedance component is disabled, the switching circuit operates at a switching frequency in a second frequency range, and a second lamp current is provided to the lamp set. Accordingly, the first frequency range is lower than the second frequency range, and the first lamp current is greater than the second lamp current. Thus, the lamp set operates at the first lighting level, providing more lumens, when the impedance component is enabled, and the lamp set operates at the second lighting level, providing less lumens, when the impedance component is disabled.

In an embodiment, there is provided a ballast. The ballast includes: a self-oscillating inverter circuit having an inverter input to receive direct current (DC) voltage and an inverter output to selectively provide an alternating current (AC) lamp current to energize one or more lamps. The self-oscillating inverter circuit includes: a switching circuit, wherein the switching circuit operates at a switching frequency; a feedback transformer connected to the inverter output to drive the switching circuit as a function of the lamp current at the inverter output; and an impedance component connected in parallel with the feedback transformer between the inverter input and the feedback transformer. The switching circuit operates such that, when the impedance component is enabled, the switching circuit operates at a switching frequency in a first frequency range and a first lamp current is provided to the one or more lamps; and when the impedance component is disabled, the switching circuit operates at a switching frequency in a second frequency range and a second lamp current is provided to the one or more lamps, wherein the first frequency range is lower than the second frequency range and the first lamp current is greater than the second lamp current. The ballast also includes a control circuit connected to the impedance component of the inverter circuit, wherein the control circuit selectively operates the impedance component between a first state, in which the impedance component is enabled, and a second state, in which the impedance component is disabled.

In a related embodiment, the impedance component may be a capacitor. In another related embodiment, the switching circuit may be a half-bridge resonant inverter having a first switching component and a second switching component. In a further related embodiment, the feedback transformer may include a primary winding, a first secondary winding to drive the first switching component, and a second secondary winding to drive the second switching component, and the impedance component may be connected in parallel with primary winding between the inverter input and the primary winding.

In another related embodiment, the first frequency range may be 195 to 205 kHz, and the second frequency range may be 215 to 220 kHz. In yet another related embodiment, the ballast may further include: an electromagnetic interference filter configured to receive alternating current (AC) voltage from a power source; a rectifier connected to the electromagnetic interference filter to convert the alternating current (AC) voltage to direct current (DC) voltage; a power factor correction circuit connected to the rectifier to produce a DC voltage output; and a DC voltage bus connected to the power factor correction circuit to receive the DC voltage output from the power factor correction circuit, the inverter input may be connected to the DC voltage bus to receive the DC voltage. In a further related embodiment, the control circuit may have a first control circuit input and a second control circuit, the first control circuit input may be selectively connected and disconnected to an AC power supply via a switch, and the second control circuit input may be connected between the rectifier and the power factor correction circuit. In a further related embodiment, the first control circuit input may be connected to the AC power supply via the switch and receives AC power therefrom, the impedance component may be disabled, and when the first control circuit input is disconnected from the AC power supply, the impedance component may be enabled.

In another related embodiment, the control circuit may include a first transistor and a second transistor, the first transistor may be selectively connected and disconnected to an AC power supply, and the second transistor may be connected to the first transistor and to the impedance component, wherein when the first transistor is connected to the AC power supply, the first transistor may be conductive, the second transistor may be nonconductive, and the impedance component may be disabled, and when the first transistor is disconnected from the AC power supply, the first transistor may be nonconductive, the second transistor may be conductive, and the impedance component may be enabled. In yet another related embodiment, the ballast may be adapted to energize an electrodeless lamp.

In another embodiment, there is provided a method of selectively operating a lamp between a first lighting level and a second lighting level. The method includes: providing lamp current to the lamp via a self-oscillating inverter circuit, wherein the lamp current provided to the lamp is a function of the switching frequency of the inverter circuit; controlling the switching frequency of the inverter circuit via a feedback transformer, wherein the lamp current provided to the lamp is a function of the switching frequency of the inverter circuit; enabling an impedance component connected in parallel with the feedback transformer so that the inverter circuit is operated at a switching frequency in a first frequency range; and disabling the impedance component connected in parallel with the feedback transformer so that the inverter circuit is operated at a switching frequency in a second frequency range, wherein the first frequency range is lower than the second frequency range.

In a related embodiment, the method may include operating the lamp at the first lighting level when the impedance component is enabled; and operating the lamp at the second lighting level when the impedance component is disabled; wherein the first lighting level may produce a greater amount of lumens than the second lighting level. In another related embodiment, enabling the impedance component may include: increasing an amount of impedance connected in parallel with a primary winding of the feedback transformer. In yet another related embodiment, disabling the impedance component may include: connecting a control circuit to a ballast power source; and enabling the impedance component may include: disconnecting the control circuit from the ballast power source.

In another embodiment, there is provided a ballast. The ballast includes: a self-oscillating inverter circuit having an inverter input to receive direct current (DC) voltage and an inverter output to selectively provide an alternating current (AC) lamp current to energize one or more lamps, wherein the self-oscillating inverter circuit: operates in a first state having a switching frequency in a first frequency range, wherein the self-oscillating inverter circuit provides a first lamp current to the one or more lamps; and operates in a second state having at a switching frequency in a second frequency range, wherein the self-oscillating inverter circuit provides a second lamp current to the one or more lamps, wherein the first frequency range is lower than the second frequency range and the first lamp current is greater than the second lamp current; and a control circuit connected to the inverter circuit to control an impedance of the inverter circuit to selectively operate the inverter circuit between the first state and the second state.

In a related embodiment, the control circuit may be configured to increase the impedance of the inverter circuit to operate the inverter in the first state rather than the second state. In another related embodiment, the ballast may further include: an electromagnetic interference filter configured to receive alternating current (AC) voltage from a power source; a rectifier connected to the electromagnetic interference filter to convert the alternating current (AC) voltage to direct current (DC) voltage; a power factor correction circuit connected to the rectifier to produce a DC voltage output; and a DC voltage bus connected to the power factor correction circuit to receive the DC voltage output from the power factor correction circuit, wherein the inverter input may be connected to the DC voltage bus to receive the DC voltage. In a further related embodiment, the control circuit may have a first control circuit input and a second control circuit, wherein the first control circuit input may be selectively connected and disconnected to an AC power supply via a switch, and the second control circuit input may be connected between the rectifier and the power factor correction circuit. In a further related embodiment, when the first control circuit input is connected to the AC power supply, the inverter circuit may operate in the second state, and when the first control circuit input is disconnected from the AC power supply, the inverter circuit may operate in the first state.

In another related embodiment, the ballast may be adapted to energize an electrodeless lamp to selectively operate between a first lighting level and a second lighting level, wherein the electrodeless lamp operates at the first lighting level when the inverter circuit is operating in the first state, and the electrodeless lamp operates at the second lighting level when the inverter circuit is operating in the second state, wherein the first lighting level provides a greater amount of lumens than the second lighting level.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 3 is a flow chart of a method performed by a lamp system to selectively operate a lamp between a first lighting level and a second lighting level according to embodiments disclosed herein.

DETAILED DESCRIPTION

Figure 1:
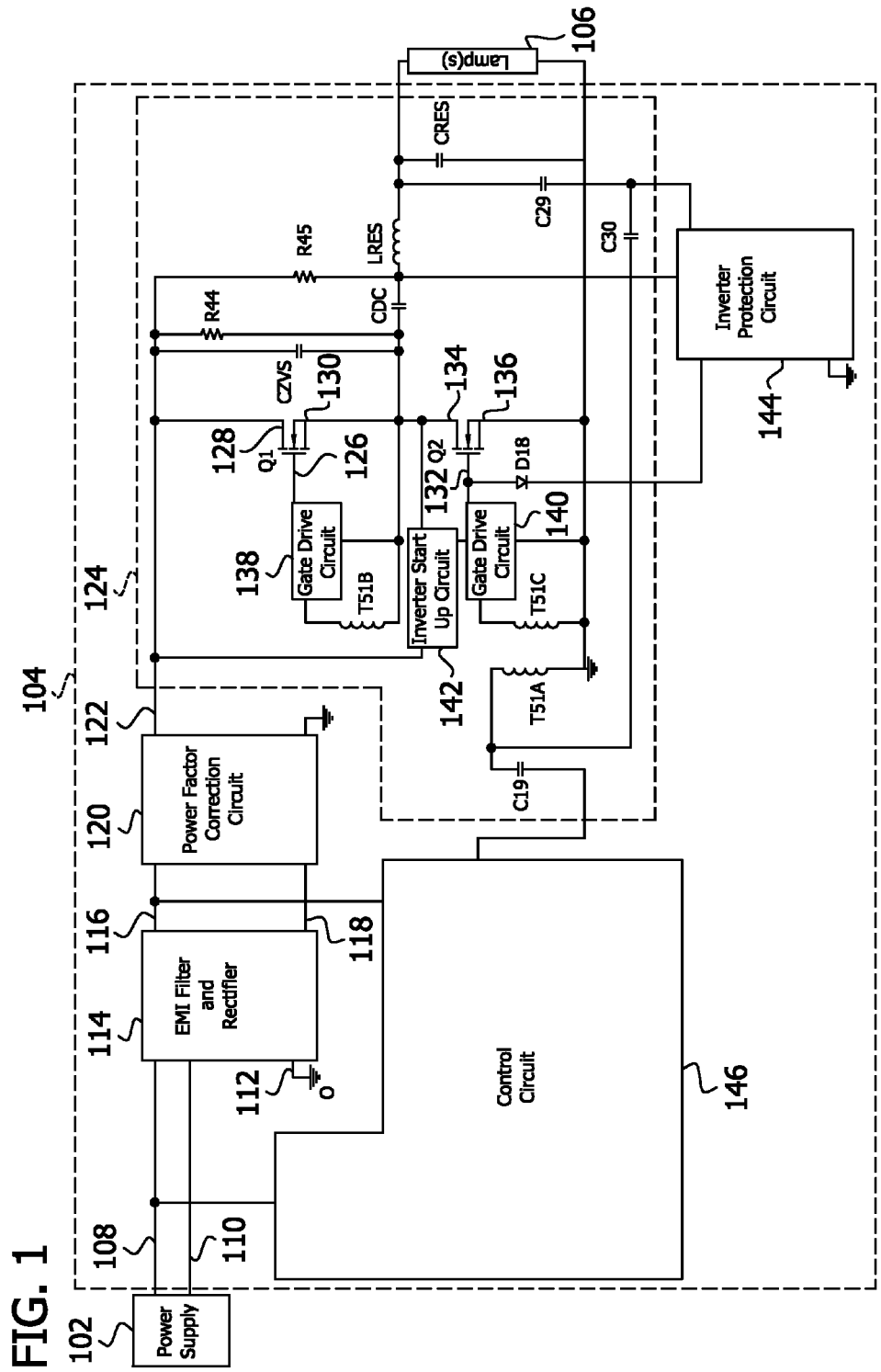
FIG. 1 is a schematic diagram, partially in block form, of a lamp system according to embodiments disclosed herein.

FIG. 1 illustrates a lamp system 100. The lamp system 100 includes an input power source, such as but not limited to an alternating current (AC) power supply 102. The lamp system 100 also includes an electronic ballast 104 (hereinafter ballast 104) and a lamp 106. Although the lamp 106 is illustrated in FIG. 1 as a single lamp, in some embodiments, the lamp 106 may be one lamp or a plurality of lamps connected together in series. In some embodiments, the lamp 106 is an electrodeless lamp, such as but not limited to an ICETRON® lamp available from OSRAM SYLVANIA, a QL induction lamp available from Philips, a GENURA lamp available from General Electric, or an EVERLIGHT lamp available from Matsushita. Though the lamp system 100 is described throughout as energizing an electrodeless lamp, the lamp system 100 may be used to energize other types of lamps without departing from the scope of the invention.

The ballast 104 includes a high voltage input terminal (i.e., line voltage input terminal) 108 adapted to be connected to an alternating current (AC) power supply (e.g., standard 120V AC household power) (such as but not limited to the AC power supply 102). The ballast 104 also includes a neutral input terminal 110 and a ground terminal 112 connectable to ground potential. An input AC power signal is received by the ballast 104 from the AC power supply 102 via the high voltage input terminal 108. The ballast 104 includes an electromagnetic interference (EMI) filter and a rectifier (e.g., full-wave rectifier) 114, which are illustrated together in FIG. 1. The EMI filter portion of the EMI filter and rectifier 114 prevents noise that may be generated by the ballast 104 from being transmitted back to the AC power supply 102. The rectifier portion of the EMI filter and rectifier 114 converts AC voltage received from the AC power supply 102 to DC (direct current) voltage. The rectifier portion includes a first output terminal connected to a DC bus 116 and a second output terminal connected to a ground potential at ground connection point 118. Thus, the EMI filter and rectifier 114 outputs a DC voltage on the DC bus 116.

A power factor correction circuit 120, which may be, in some embodiments, a boost converter, is connected to the first and second output terminals of the EMI filter and rectifier 114. The power factor correction circuit 120 receives the rectified DC voltage and produces a high DC voltage on a high DC voltage bus ("high DC bus") 122. For example, the power factor correction circuit 120 may provide a voltage of around 450 volts to the high DC voltage bus 122. An inverter circuit 124 having an inverter input is connected to the power factor correction circuit 120 to receive the high DC voltage and convert it to AC voltage. The inverter circuit 124 has an inverter output adapted to connect to the lamp 106 to selectively provide AC current to the lamp 106 to energize the lamp 106.

In the lamp system 100 as shown in FIG. 1, the inverter circuit 124 includes a half-bridge resonant inverter. Alternatively, in some embodiments, other self-oscillating inverter circuits may be used. In particular, the inverter circuit 124 includes a switching circuit to operate at a switching frequency to convert the DC voltage received by the inverter circuit 124 to AC voltage. In some embodiments, the switching circuit includes a first switching component Q1 and a second switching component Q2, as shown in FIG. 1. For example, the first and second switching components Q1, Q2 may each comprise a metal-oxide-semiconductor field-effect transistor (MOSFET). As such, the first switching component Q1 has a gate terminal 126, a drain terminal 128, and a source terminal 130. Similarly, the second switching component Q2 has a gate terminal 132, a drain terminal 134, and a source terminal 136. A first gate drive circuit 138 is connected at the gate terminal 132 of the first switching component Q1, and a second gate drive circuit 140 is connected at the gate terminal 132 of the second switching component Q2. An inverter start-up circuit 142 is connected at the drain terminal 134 of the second switching component Q2 to initially activate the second switching component Q2. Once the second switching component Q2 is initially turned on by the inverter start-up circuit 142, the first and second switching components Q1, Q2 are complementarily commutated via first and second gate drive circuits 138, 140. In other words, the switching circuit is operated such that when the first switching component Q1 is conductive (e.g., ON), the second switching component Q2 is non-conductive (e.g., OFF). Likewise, when the second switching component Q2 is conductive (e.g., ON), the first switching component Q1 is non-conductive (e.g., OFF).

The inverter circuit 124 includes a resonant circuit comprising an inductor $L_{RES}$ and a capacitor $C_{RES}$ connected together in series. The resonant circuit $L_{RES}$, $C_{RES}$ is connected to the source terminal 130 of the first switching component Q1 via a DC blocking capacitor $C_{DC}$. The resonant circuit $L_{RES}$, $C_{RES}$ provides a high voltage to ignite the lamp 106 and a magnitude-limited current to operate the lamp 106 at a particular current. In some embodiments, a capacitor $C_{ZVS}$ is connected between the drain terminal 128 and the gate terminal 126 of the first switching component Q1 to improve EMI and ensuring zero voltage switching. The lamp system 100 also includes an inverter protection circuit 144 connected to the high DC bus 122 via resistors R44 and R45. The inverter protection circuit 144 detects an overvoltage condition. In some embodiments, the inverter protection circuit 144 senses the AC voltage signal being provided to the lamp 106 via feedback capacitors C29 and C30 and shuts down the inverter circuit 124 if the AC voltage exceeds a predefined threshold value. For example, the inverter protection circuit 144 is able to shut down the inverter circuit 124 when there is no lamp 106 connected to the ballast 104, because the lamp 106 is not present or because wires used to connect the lamp 106 to the ballast 104 have become disconnected.

A feedback circuit is connected to the inverter output to drive the switching circuit as a function of the lamp current and lamp voltage at the inverter output. In particular, the feedback circuit provides an output signal having a magnitude and phase for supporting free oscillations in the inverter circuit 124. In FIG. 1, the feedback circuit includes a feedback transformer having a primary winding T51A, a first secondary winding T51B, and a second secondary winding T51C, along with serial capacitors C29 and C30. The primary winding T51A is coupled to the lamp 106 via the serial capacitors C29 and C30. The first secondary winding T51B is connected between source terminal 130 of the first switching component Q1 and the first gate drive circuit 138. The second secondary winding T51C is connected between source terminal 136 of the second switching component Q2 and the second gate drive circuit 140. A capacitor C30, which is connected across the primary winding T51A of the feedback transformer, acts as a compensation capacitor to adjust the phase of the voltage across the second secondary winding T51C. A detailed description of an exemplary feedback circuit is set forth in U.S. Pat. No. 6,819,057 to Alexandrov, the entire contents of which are hereby incorporated by reference.

The inverter circuit 124 also includes an impedance component, such as a capacitor C19, connected in parallel with the primary winding T51A of the feedback transformer. It is to be noted that while the impedance component is illustrated and discussed herein as the capacitor C19, the impedance component could include multiple capacitors or other types of impedance components known in the art without departing from the scope of the invention. A control circuit 146 is connected to the inverter circuit 124 via the capacitor C19. The control circuit 146 is configured to selectively operate capacitor C19 between a first state and a second state. In the first state, the capacitor C19 is enabled (e.g., an operative component of the inverter circuit 124). In the second state, the capacitor C19 is disabled (e.g., a non-operative component of the inverter circuit 124). When the capacitor C19 is enabled, the switching circuit operates at a switching frequency in a first frequency range, and a first lamp current is provided to the lamp 106. When the capacitor C19 is disabled, the switching circuit operates at a switching frequency in a second frequency range, and a second lamp current is provided to the lamp 106. When the capacitor C19 is enabled rather than disabled, it acts as an additional impedance source connected in parallel with the primary winding T51A of the feedback transformer. As such, the first frequency range is lower than the second frequency range, and the first lamp current is greater than the second lamp current. In some embodiments, the first frequency range is 195-205 kHz, and the first lamp current is about 365-380 mA. The second frequency range is 215-220 kHz, and the second lamp current is about 300-310 mA. Accordingly, the lamp 106 operates at a first lighting level when the capacitor C19 is enabled, and at a second lighting level when the capacitor C19 is disabled. The first lighting level produces a greater amount of lumens than the second lighting level, and thus the first lighting level appears brighter than the second lighting level.

Figure 2:
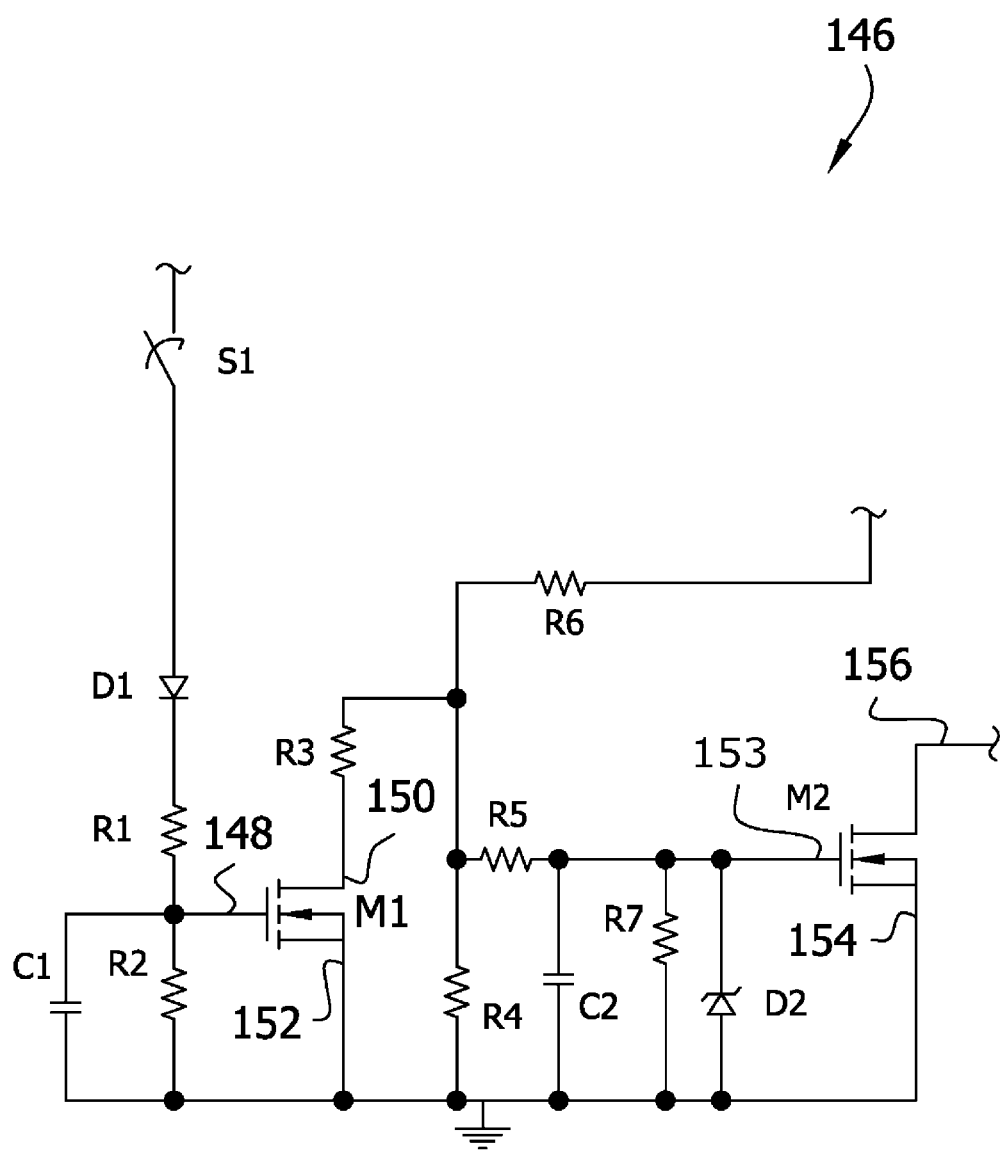
FIG. 2 is a schematic diagram of a control circuit of the lamp system of FIG. 1 according to embodiments disclosed herein.

FIG. 2 is a circuit schematic of the control circuit 146 of FIG. 1, showing greater detail. In FIG. 2, the control circuit 146 includes a switch S1 at a first control circuit input terminal to selectively connect the control circuit 146 to the high voltage input terminal 108 shown in FIG. 1. A first diode D1, having an anode and a cathode, is connected at the cathode to the switch 51 to prevent current from flowing from the control circuit 146 back to the power supply 102. The anode of the diode D1 is connected via a resistive network R1, R2 to a gate terminal 148 of a first transistor M1. When the switch 51 is conductive (e.g., ON), the control circuit 146 is connected to the power supply 102, and a positive voltage exists at the anode of the first diode D1. Accordingly, the first diode D1 conducts current through the resistive network R1, R2. The resistive network R1, R2 acts as a voltage divider, with the gate terminal 148 of the first transistor M1 being connected between the resistors R1 and R2. The resistor R2 and a source voltage of the first transistor M1 are connected to a ground potential. Thus, the current through the resistor R2 generates a voltage across the gate terminal 148 and a source terminal 152 of the first transistor M1. The first transistor M1 is conductive (e.g., ON) while the generated gate-to-source voltage exists. The control circuit 146 may include one or more capacitors, such as a capacitor C1, to filter and smooth the generated gate-to-source voltage. As such, when the switch S1 is conductive (i.e., connected to the high voltage input terminal 108), the first transistor M1 is conductive (e.g., ON).

The control circuit 146 has a second control circuit input terminal that is connected to the DC bus 116. A resistive network R3, R4, R6 reduces the DC voltage received from the DC bus 116 by the control circuit 146. A capacitor C2 filters the DC voltage received from the DC bus 116 by the control circuit 146. As shown in FIG. 2, a drain terminal 150 of the first transistor M1 is connected to the DC bus 116 via the resistors R3 and R6. A resistor R5 is connected between the resistor R4 and the capacitor C2 to operate as a current limiter. A gate resistor R7 is connected in parallel with the capacitor C2. A Zener diode D2 is connected in parallel with the resistor R7 and the capacitor C2. The Zener diode D2 is also connected to a second transistor M2. In particular, a cathode of the Zener diode D2 is connected to a gate terminal 153 of the second transistor M2, and an anode of the Zener diode D2 is connected to ground potential. When the first transistor M1 is conductive, the gate terminal 153 of the second transistor M2 is pulled low, thereby turning the second transistor M2 off (non-conductive). Thus, when the switch S1 is conductive (i.e., connected to the high voltage input terminal 108), the first transistor M1 is conductive and the second transistor M2 is not conductive. As a result, the capacitor C19 is disabled so no additional impedance is added in parallel with the primary winding T51A of the feedback transformer, and the lamp 106 operates at a high frequency, producing a low light level output (i.e., low lumen output).

On the other hand, when the first transistor M1 is not conductive, there is sufficient (e.g., threshold) gate voltage to turn the second transistor M2 ON (conductive). Thus, when the switch S1 is not conductive (i.e., disconnected from the high voltage input terminal 108), the first transistor M1 is not conductive and the second transistor M2 is conductive. As a result, the capacitor C19 is enabled and thereby adds impedance in parallel with the primary winding T51A of the feedback transformer, so that the lamp 106 operates at a low frequency, producing a high light level output (i.e., high lumen output).

FIG. 3 is a flow chart of steps performed by the lamp system 100 as described above with regards to FIGS. 1-2. Of course, the steps described in FIG. 3 may be performed by other embodiments of the lamp system 100 that selectively operate a lamp connected thereto between a first lighting level (e.g., high lumen output) and a second lighting level (e.g., low lumen output). At 202, a self-oscillating inverter circuit provides lamp current to the lamp. The lamp current provided to the lamp is a function of the switching frequency of the inverter circuit. At 204, a feedback transformer controls the switching frequency of the inverter circuit. In particular, the lamp current provided to the lamp is a function of the switching frequency of the inverter circuit. At 206, a control circuit enables an impedance component connected in parallel with the feedback transformer, so that the inverter circuit is operated at a switching frequency in a first frequency range. At 208, the control circuit disables the impedance component connected in parallel with the feedback transformer, so that the inverter circuit is operated at a switching frequency in a second frequency range. The first frequency range is lower than the second frequency range, so the lamp operates at the first lighting level when the impedance component is enabled, and the lamp operates at the second lighting level when the impedance component is disabled. As described above, in some embodiments, the control circuit may be configured to enable the impedance component when the control circuit is disconnected from the AC power supply, and to disable the impedance component when the control circuit is connected to the AC power supply.

In alternative embodiments, the control circuit 146 may be embodied as a set of instructions that are executed within a microprocessor, microcontroller, or the like. In such embodiments, the control circuit 146 may enable and/or disable the capacitor C19, and thus control whether the lamp 106 is illuminated at the first lighting level or at the second lighting level, by, for example, operating a switch that connects/disconnects the capacitor C19 from the primary winding T51A of the feedback transformer. In such embodiments, the set of instructions may be stored within a memory device that is part of the control circuit 146 or that is a separate component from the control circuit 146. The set of instructions may include, but is not limited to, the steps shown in FIG. 3, and may, in some embodiments, include computer programming code that, when executed on a processor within the control circuit 146, cause the control circuit 146 to perform the actions described throughout. Further, in such embodiments, the control circuit 146 may be located within the ballast 104, as shown in FIG. 1, or may be external to the ballast 104 but otherwise connected to the ballast 104 via, for example but not limited to, a network connection.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A ballast comprising:
a self-oscillating inverter circuit having an inverter input to receive direct current (DC) voltage and an inverter output to selectively provide an alternating current (AC) lamp current to energize one or more lamps, the self-oscillating inverter circuit comprising:
a switching circuit, wherein the switching circuit operates at a switching frequency;
a feedback transformer connected to the inverter output to drive the switching circuit as a function of the lamp current at the inverter output; and
an impedance component connected in parallel with the feedback transformer between the inverter input and the feedback transformer;
the switching circuit operating such that, when the impedance component is enabled, the switching circuit operates at a switching frequency in a first frequency range and a first lamp current is provided to the one or more lamps;
the switching circuit operating such that, when the impedance component is disabled, the switching circuit operates at a switching frequency in a second frequency range and a second lamp current is provided to the one or more lamps, wherein the first frequency range is lower than the second frequency range and the first lamp current is greater than the second lamp current; and
a control circuit connected to the impedance component of the inverter circuit, wherein the control circuit selectively operates the impedance component between a first state, in which the impedance component is enabled, and a second state, in which the impedance component is disabled;
wherein the control circuit comprises a first transistor and a second transistor, wherein the first transistor is selectively connected and disconnected to an AC power supply, and the second transistor is connected to the first transistor and to the impedance component, wherein when the first transistor is connected to the AC power supply, the first transistor is conductive, the second transistor is nonconductive, and the impedance component is disabled, and when the first transistor is disconnected from the AC power supply, the first transistor is nonconductive, the second transistor is conductive, and the impedance component is enabled.

2. The ballast of claim 1 wherein the impedance component is a capacitor.

3. The ballast of claim 1 wherein the switching circuit is a half-bridge resonant inverter having a first switching component and a second switching component.

4. The ballast of claim 3 wherein the feedback transformer comprises a primary winding, a first secondary winding to drive the first switching component, and a second secondary winding to drive the second switching component, and wherein the impedance component is connected in parallel with primary winding between the inverter input and the primary winding.

5. The ballast of claim 1 wherein the first frequency range is 195 to 205 kHz, and the second frequency range is 215 to 220 kHz.

6. The ballast of claim 1 further comprising:
an electromagnetic interference filter configured to receive alternating current (AC) voltage from a power source;
a rectifier connected to the electromagnetic interference filter to convert the alternating current (AC) voltage to direct current (DC) voltage;
a power factor correction circuit connected to the rectifier to produce a DC voltage output; and
a DC voltage bus connected to the power factor correction circuit to receive the DC voltage output from the power factor correction circuit, wherein the inverter input is connected to the DC voltage bus to receive the DC voltage.

7. The ballast of claim 6 wherein the control circuit has a first control circuit input and a second control circuit, wherein the first control circuit input is selectively connected and disconnected to an AC power supply via a switch, and the second control circuit input is connected between the rectifier and the power factor correction circuit.

8. The ballast of claim 7 wherein when the first control circuit input is connected to the AC power supply via the switch and receives AC power therefrom, the impedance component is disabled, and when the first control circuit input is disconnected from the AC power supply, the impedance component is enabled.

9. The ballast of claim 1 wherein the ballast is adapted to energize an electrodeless lamp.

10. A ballast comprising:
a self-oscillating inverter circuit having an inverter input to receive direct current (DC) voltage and an inverter output to selectively provide an alternating current (AC) lamp current to energize one or more lamps, wherein the self-oscillating inverter circuit:
operates in a first state having a switching frequency in a first frequency range, wherein the self-oscillating inverter circuit provides a first lamp current to the one or more lamps; and
operates in a second state having at a switching frequency in a second frequency range, wherein the self-oscillating inverter circuit provides a second lamp current to the one or more lamps,
wherein the first frequency range is lower than the second frequency range and the first lamp current is greater than the second lamp current; and
a control circuit connected to the inverter circuit to control an impedance of the inverter circuit to selectively operate the inverter circuit between the first state and the second state;
wherein the control circuit comprises a first transistor and a second transistor, wherein the first transistor is selectively connected and disconnected to an AC power supply, and the second transistor is connected to the first transistor and to an impedance component of the self-oscillating inverter circuit, wherein when the first transistor is connected to the AC power supply, the first transistor is conductive, the second transistor is nonconductive, and the impedance component is disabled, and when the first transistor is disconnected from the AC power supply, the first transistor is nonconductive, the second transistor is conductive, and the impedance component is enabled.

11. The ballast of claim 10 wherein the control circuit is configured to increase the impedance of the inverter circuit to operate the inverter in the first state rather than the second state.

12. The ballast of claim 10 further comprising:
an electromagnetic interference filter configured to receive alternating current (AC) voltage from a power source;
a rectifier connected to the electromagnetic interference filter to convert the alternating current (AC) voltage to direct current (DC) voltage;
a power factor correction circuit connected to the rectifier to produce a DC voltage output; and a DC voltage bus connected to the power factor correction circuit to receive the DC voltage output from the power factor correction circuit, wherein the inverter input is connected to the DC voltage bus to receive the DC voltage.

13. The ballast of claim 12 wherein the control circuit has a first control circuit input and a second control circuit, wherein the first control circuit input is selectively connected and disconnected to an AC power supply via a switch, and the second control circuit input is connected between the rectifier and the power factor correction circuit.

14. The ballast of claim 13 wherein when the first control circuit input is connected to the AC power supply, the inverter circuit operates in the second state, and when the first control circuit input is disconnected from the AC power supply, the inverter circuit operates in the first state.

15. The ballast of claim 10 wherein the ballast is adapted to energize an electrodeless lamp to selectively operate between a first lighting level and a second lighting level, wherein the electrodeless lamp operates at the first lighting level when the inverter circuit is operating in the first state, and the electrodeless lamp operates at the second lighting level when the inverter circuit is operating in the second state, wherein the first lighting level provides a greater amount of lumens than the second lighting level.

* * * * *